BITERNARY PULSE CODE SYSTEM

Filed Nov. 8, 1962

5 Sheets-Sheet 1

INVENTOR,
ALBERT P. BROGLE, JR.

BY Harry M. Saragovitz

ATTORNEY

Jan. 18, 1966 A. P. BROGLE, JR 3,230,310

BITERNARY PULSE CODE SYSTEM

Filed Nov. 8, 1962 5 Sheets-Sheet 2

INVENTOR,
ALBERT P. BROGLE, JR
BY Harry M. Saragovitz
ATTORNEY.

INVENTOR,
ALBERT P. BROGLE, JR.

BY Harry M. Saragovitz

ATTORNEY.

BITERNARY PULSE CODE SYSTEM

Filed Nov. 8, 1962 5 Sheets-Sheet 4

INVENTOR,
ALBERT P. BROGLE, JR.
BY Harry M. Saragovitz
ATTORNEY.

Jan. 18, 1966 A. P. BROGLE, JR 3,230,310

BITERNARY PULSE CODE SYSTEM

Filed Nov. 8, 1962 5 Sheets-Sheet 5

INVENTOR,
ALBERT P. BROGLE, JR.
BY Harry M. Saragovitz
ATTORNEY.

United States Patent Office
3,230,310
Patented Jan. 18, 1966

3,230,310
BITERNARY PULSE CODE SYSTEM

Albert P. Brogle, Jr., Rumson, N.J., assignor to the United States of America as represented by the Secretary of the Army
Filed Nov. 8, 1962, Ser. No. 236,461
9 Claims. (Cl. 178—68)
(Granted under Title 35, U.S. Code (1952), sec. 266)

The invention described herein may be manufactured and used by or for the Government for governmental purposes, without the payment of any royalty thereon.

This invention relates to pulse code transmission systems and more particularly to a new and improved system for transmitting a large quantity of information in a limited bandwidth.

A fundamental problem of pulse code system is the selection of the method of transmission which yields best overall performance for least total cost in required equipment. For an acceptable solution, this choice must be made within the permissible limits of these factors and under the constraints of restricted bandwidth, specified transmission media and modulations, given power outputs and transmission losses, predicted noise levels, and so forth. The demands for high accuracy, together with the wide range of transmission conditions to be overcome in these systems, further restrict this choice to a very few types of known transmission techniques which could conceivably satisfy the requirements.

In pulse code modulation, the analog signals to be transmitted are sampled at regular intervals and the amplitude of each sample is sent by a coded group of pulses. The usual method of coding is to represent each sample by a group of on-off or binary pulses. However, the definition of pulse code modulation does not preclude coding of these samples by higher order numerical forms such as ternary, quaternary, quinary, etc., codes.

As might be inferred from the term "modulation" the pulse coding ordinarily would be applied to high frequency carriers either for wireless or wire transmission, altho the term can properly apply to a direct current also in the case of wire transmission. Similarly, analog (voice, etc.) and various other binary (telegraph, Teletype, etc.) information waves are applied to carriers or to direct current. Operation without a carrier is most common for rather simple systems, altho analog signals coded as above could be so transmitted.

At the receiving end, the radio frequency carrier, if any, is amplified and demodulated. The resulting signal is then resampled and applied to a slicing circuit, which produces regenerated pulse code pulses whenever the voltage applied to its falls within the prescribed range. Because of noise on the transmission path, bandwidth limitations and system imperfections, the received pulses, before sampling and regeneration, will differ in shape from the transmitted pulses. These distortions and uncertainties will affect the output, however, only if they are of sufficient amplitude at the sampling times to cause the slicing circuit to make an improper decision.

In theory, the use of pulse code modulation allows bandwidth and signal-to-noise ratio to be exchanged according to the same logarithmic law in an ideal communication channel. The bandwidth is established independently of noise by consideration of the maximum rate at which pulses can be transmitted through a perfect low-pass characteristic without mutual interference between pulses. Under this condition, the presence of Gaussian noise in the channel limits the number of independent amplitudes that can be reliably detected in any pulse interval. For given signal-to-noise ratio and bandwidth conditions, the maximum rate of transmission of information is thus specified in the well-known manner.

Pulse code systems employing binary or two-valued codes are the logical first choice for satisfying any pulse code communication requirement. Of all known pulse code signal forms, these binary systems are the easiest to implement and yield best performance in the face of interferences and uncertainties met in military applications. However, practical binary systems have a major limitation in the information rate which can be transmitted through a given bandwidth since the pulse rate without mutual interference, and thus the information rate, is limited by the bandwidth of the system.

In the simplest applications a D.C. current is varied according to the information, preferably from zero to double the average amplitude. The concept of varying about an average is more helpful for analysis than the equivalent concept of turning line current on and off. The average D.C. current can carry no information and is therefore wasted in ordinary "neutral" line operation, being dissipated as heat, causing magnetic saturation of line components, etc., but can be eliminated by suitable biasing as in ordinary "polar" line operation. A related yet separate factor arises from successions of like information pulses, requiring that line carry low frequency components for the information, without excessive magnetic saturation, etc. In the case of successions of unlike pulses the maximum information rate is determined by the highest A.C. frequency component the line can pass.

In modulating a carrier needless waste and radiation (but no magnetic saturation in any usual sense) also can be avoided by carrier suppression, analogous to polar operation mentioned above, and often single side band transmission. The successions of like information pulses still require sideband frequency components very near the carrier and the successions of unlike information pulses still require frequency components near the carrier plus (or minus) the A.C. frequency components noted above. In either case the bandwidth required is represented by the limits of these information signal frequency components. In carrier systems saturation could occur in detector circuits but involves no substantial problem, either for the carrier if not suppressed or the information components near the carrier. In carrier applications the elementary waveform above often becomes a symmetrical pair of envelopes, crossing at the symmetry line if the signal phase reverses relative to the carrier, Crossed square envelopes would form a superficially uniform envelope, but the actual effect on various circuits usually requires analysis as separate envelopes. Although use of carriers complicates analysis it does not change the overall significance of bandwidth in neutral or polar, audible carrier, ordinary keyed CW, suppressed carrier or SSB, FSK or FM, or other forms of telegraph and similar signals.

In non-carrier lines the saturation from low frequency information components is minimized by special codes, particularly a three level binary derived code called "twinned binary" by L. A. Meacham in Patent No. 2,579,047 and now better known as "dicode," or statistically identical "bipolar" which is easier to decode. In these codes 50% of elements are at median level and 25% at each of upper and lower extreme level, but one extreme level is never repeated until the other extreme level has occurred, the essential property which reduces saturation by low frequency information components; however, successive opposite extreme levels frequently occur, a point to be considered later. In closely similar double bipolar, elements at each extreme level occur only in pairs.

In a number of important applications, including 24 and 96 channel systems being developed for the Army, binary transmission cannot be employed because of the low information rate capability due to insufficient bandwidth afforded by the required transmission facility. Therefore recourse to some other method has become necessary in order to meet these communication demands.

Ternary, or three level, and quaternary, or four level, codes are higher order forms of pulse code modulation which were investigated and found to be unsatisfactory for the above-mentioned military applications. Each of these codes achieves the desirable result of increasing the information rate which can be handled by a system of given bandwidth, but ternary transmission contains only 1.58 bits of information per pulse which is too low for the results desired, and quaternary transmission results in excessive error rate.

The use of quaternary transmission appeared to be the ideal solution since the information rate, or channel capacity, is doubled without increasing the bandwidth. The pulses are transmitted at the same rate as for a binary signal but possess two bits of information per pulse since each pulse has four possible amplitudes, and the individual pulse response characteristic of the binary system is preserved.

This gain in the information rate of a quaternary system is exchanged for a considerable reduction in the tolerance of the system to all types of interference. In order to prevent exceeding a specified error rate, the total allowable interference, including noise, must be kept to about one-third of the level permissible with binary transmission. The absolute magnitude of the uncertainties that can be allowed with quaternary transmission therefore becomes quite small and, for some applications, leads to the necessity of taking elaborate and expensive precautions to assure acceptable performance. The sensitivity of quaternary systems to certain types of distortion, such as low-frequency cut-off effects which exist because of the presence of low-frequency order wire facilities or in wire transmission systems because of the transformers employed for increased efficiency and other reasons, is so high under other applications that adequate performance cannot be obtained by any known means. For these reasons, quaternary transmission failed to meet present communication demands.

Prior to this invention, it was implicit in the treatment of practical pulse transmission that there was a limitation on the rate of transmission of information attributable primarily to bandwidth effects and noise. As a corollary proposition, this concept also postulated that the provision of minimum mutual interference between pulses in the absence of noise and system imperfections would automatically result in minimum errors in reception when these errors were present. The uncertainties in pulse code modulation arising from variations and imperfections in the characteristics of the system, although possessing noise-like qualities, have a fundamentally different effect on transmission performance than the presence of additive Gaussian noise in a perfect low-pass transmission path. The error occurring from these sources has generally been referred to as system error in order to distinguish it from the error produced by noise alone. Because this error has been presumed to be predictable, therefore capable of elimination, at least in principle, it has not been taken into account in determining channel capacity in ideal pulse code modulation theory. In actual systems however, it turns out that system error is not sufficiently predictable to be corrected or disregarded.

Intersymbol interference between pulses, and consequent errors in the output if this interference is large enough, is one result of system uncertainty. Another is signal distortion occurring within the pulse interval. Still another is the effective distortion resulting from variations in the time of resampling the pulses. Exclusive of the exact source and form of these uncertainties, they all possess the common property of being dependent on some characteristic of the signal itself. As a consequence, the uncertainties and errors arising from system variations and imperfections place a limitation on pulse code modulation channel capacity which, unlike noise, cannot be effectively combatted by increasing signal power or, in some instances, by increasing bandwidth. Furthermore, they create this limitation in the absence of noise and to an extent sufficient to become the predominant restriction.

Thus, if system uncertainties are as basic as noise in pulse code systems, and require a different theoretical approach, it follows that useful systems can evolve under this theory which might fail to meet the conditions imposed by the conventional theory.

In accordance with this invention a new and improved pulse code system, hereinafter called a "biternary" system, has been developed. Biternary signals are generated by combining two separate binary trains by delaying one binary train one-half of a pulse interval and adding it to the second train. Since the origin of the trains is immaterial it is sufficient to specify that a first binary train be added to another binary train of the same interval length but having its transitions one-half interval delayed (or advanced) relative to the first. These separate trains, when so timed, could be considered as mutually orthogonal, of some significance in combining and later separating them. This timing requirement is readily suited to many common binary information trains, no matter what their origin, but would involve some constraint on usually non-uniform baud length codes, such as Morse Code or some forms of Teletype, requiring suitable re-timing. The combining of the two trains in this manner not only produces the biternary form which provides the desired double information capacity for the same channel bandwidth, but also involves a very elementary (2-train) type of multiplexing. Such multiplexing, usually with much larger numbers of trains, and various other forms of translation of binary trains are already common, all following the principle that binary information capacity is proportional to bandwidth; the translations are convenient for various reasons to be discussed below in analyzing the invention, an important improvement by a co-worker Ringelhaan claimed in application Serial No. 121,792, and the closest known art. In the case of a single binary train, successive pulses or groups of pulses are first separated and then combined as above. The resultant waveform closely resembles that of a ternary code inasmuch as it contains three amplitude levels, and even more closely resembles the binary derived three level codes such as dicode, bipolar, and double bipolar. In this code also 50% of elements are at median level and 25% at each of upper and lower extreme level, but successive opposite extremes never occur, the essential property which permits transmission over a line of half the bandwidth required for binary transmission; however, either extreme level can be repeated without the other extreme level, involving no significant disadvantages in carrier transmission, but in the case of non-carrier transmission requiring that the line tolerate low frequency information components. More detailed analysis in connection with error detection will show that successive like extremes are always separated by an even number of medians, including the special case zero if adjacent, and successive unlike extremes by an odd number of medians, never zero or adjacent; this provides a particularly convenient way to identify the code since it may be formed in even simpler ways according to the improvements of Ringelhaan, still providing the essential advantage of half-bandwidth requirement. Thus, the information rate has been doubled without increasing the bandwidth of facilities required for transmission. In addition, biternary pulse code systems according to this invention are significantly less sensitive than quaternary systems to interference distortion, especially to low-frequency cut-off effects.

Since the pulse rate for this biternary method is apparently double the permissible rate for binary or quaternary transmission for the same bandwidth restrictions, increased apparent mutual interference will result. However, the superior performance of biternary transmission in reducing errors contributed by certain forms of system uncertainty such as low-frequency cut-off effects will outweigh this apparent mutual interference produced by the transmission frequency characteristics alone, and the detection or decoding circuit further minimizes the apparent disadvantages of mutual interference.

Biternary transmission thus combines the assets of a transmission capacity equal to quaternary transmission, a tolerance to interference equal to ternary transmission, and an inherent error detection capability possessed by no other known pulse code modulation transmission method.

It is essential to recognize that the biternary code form is the really critical point, not an objective in itself but a technique which can be performed in several ways to permit operation at half bandwidths more effectively than prior bandwidth reduction techniques.

The detection circuit according to the invention samples the received biternary wave train every $T/2$ seconds where T is the pulse interval or length of the pulses of each of the binary trains used to form the biternary signal with the samples being taken at the $T/4$ or $3T/4$ intervals as far as the original binary signals are concerned. These samples are fed to a means which separates them into three outputs representative of the three amplitude levels of the biternary pulses. These outputs are then fed to logical gate means which separate the biternary signal into the two original binary pulse trains.

Accordingly it is a primary object of this invention to provide a novel and efficient pulse code system for doubling the information rate through a given bandwidth over that possible with a binary system.

A second object of this invention is to provide a pulse code system for transmitting a maximum rate of information with a minimum number of pulse amplitudes.

Still another object of this invention is to provide a high capacity pulse code system which has a relatively high tolerance to interferences, especially those due to low-frequency cut-off effects.

Further objects and features of the invention will become apparent upon consideration of the following detailed description taken in conjunction with the drawing, in which:

FIG. 4 and FIGS. 4A–4E are illustrations corresponding generally to FIG. 1 to emphasize the relations mentioned regarding FIG. 2;

Figure 1:
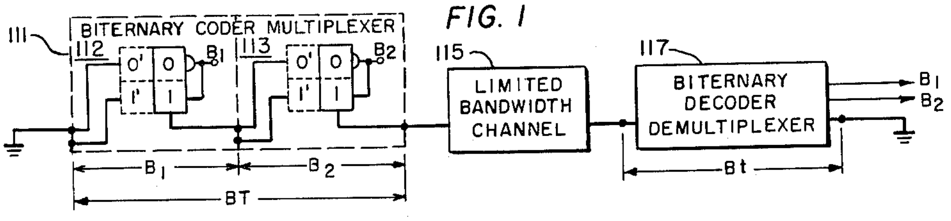
FIG. 1 is an illustration of an overall system for practicing the invention.

In binary (two level) systems the logic elements and their states, inputs, outputs, etc. are known by various names, often selected mainly for convenience in analysis; such elements may involve vacuum tube circuits or various functional equivalents and are commonly shown in block diagrams merely by symbols, which imply suitable coupling (or decoupling) means such as capacitors. This avoids the need for analysis of the circuit details, which are well understood in the art and need not be reviewed for each new system. In such symbols the polarity is arbitrary; inverting the polarity of an actual circuit often emphasizes a different aspect of operation. Not all available inputs and outputs are used in every system. The most common elements are the delay, NOT circuit, and various "binaries" and "gates."

The common binaries (2-state circuits) are the Schmitt trigger, simple bistable, complementing bistable, monostable, and astable; both bistables and often the astable are symmetrical in operation. Normally rapid transition between states may be further speeded by appropriate capacitors, not actually essential to operation or analysis.

(A) In the Schmitt trigger the amplitude of a single input relative to some bias value determines the state, often with no capacitors.

(B) In the simple bistable each input can establish one state, often with input coupling capacitors.

(C) In the complementing bistable, often used as a modulo-2 counter, a single input causes a change in state, requiring some means (as a capacitor) to store the prior state and assure change; the separate inputs of the simple bistable can also be included, if needed.

Various symbols for both bistables are well established; a dual block with outputs and inputs at each portion and complementing input at the center line (from MIL–STD–806A) is particularly simple and effective.

(D) In the monostable one input and in the astable both inputs are made non-essential by providing an RC time constant to cause the change of state; in the symbol an "X" may replace such inputs.

The Schmitt trigger may be portrayed by the usual bistable symbol with a single input direct to one portion and inverted thru a NOT symbol (a small partial or complete circle) to the other portion; thus an "input" of the appropriate magnitude direct to one portion establishes such state and absence of such input inverted to the other portion establishes such other state.

The coincidence circuit or "gate", originally emphasizing the timed opening or closing of a channel for analog signals, in binary systems is commonly designated AND gate to emphasize that all inputs must be present to provide an output. This distinguishes from an OR gate in which any input present would provide an output. However, merely reversing viewpoint as to presence and absence of inputs and outputs shows that AND and OR circuits for one polarity are identical to OR and AND circuits for the opposite polarity. More sophisticated combinations of AND and OR gates, such as the EXCLUSIVE–OR, need not be considered. The "D" shield symbol for AND gates is now almost universal; a good symbol for the OR gate is a pointed shield of one concave curve and two convex curves (also from MIL–STD–806A). The gate symbols are combined or separated for most convenient analysis and simplest diagrams. Often the same actual circuit can properly be portrayed in several ways, which may then lead to its simplification, a very sophisticated technique now commonly used to minimize the vast number of elements of computer systems. The symbols avoid the need for usual legends, permitting explanatory numerals, etc. to be used, and often show direction of signal flow, reducing the need for arrows; coupled with an arrangement to have flow mostly in one direction, this almost eliminates the need for arrows.

FIG. 1 is shown in one very elementary form suitable for analysis of the invention. The biternary coder multiplexer 111 producing wave BT involves merely the sum of the outputs of two binary coders shown as Schmitt triggers 112 and 113 separately producing waves $B_1$ and $B_2$. Ordinarily symbols for binary logic elements have no polarity significance and require no voltage reference point since there are only two levels. To indicate addition of two binary voltages the usual dual blocks with outputs only from the "1" side have been extended to show reference levels 0′ and 1′ symbolizing that output from the 1 side is 1 for state 1 or 0 for state 0 relative to reference level 0′, and would be 0 for state 1 or −1 for state 0 relative to reference level 1′; analogous relations could be identified for an output from the "0" side. With the connections shown only 0 or 1 outputs from each binary coder and only 0, 1, or 2 outputs from their sum in the biternary coder would occur. The limited bandwidth channel 115 would identify any wire or wireless system, actually of one-half the bandwidth required for binary transmission of the same information. The biternary decoder demultiplexer 117 will be more fully explained below; it also will be brought out that the multiplex aspect is not essential to the practice of the invention. In actual practice carrier suppression or analogous polar rather than neutral operation probably would be used to avoid the waste previously noted; merely changing the ground to reference level 1′ rather than 0′ in trigger 112 of the drawing would be one simple way to accomplish this change, which is actually immaterial to the invention. Since the levels in binary trains are commonly designated as spaces, zeros, etc. or marks, ones, etc., and the biternary wave is merely a sum of the two binary waves, its levels may best be designated zero, one, and two units; this is most readily analyzed for the neutral mode of operation to avoid considering the ground as other than a zero level.

Figure 2:
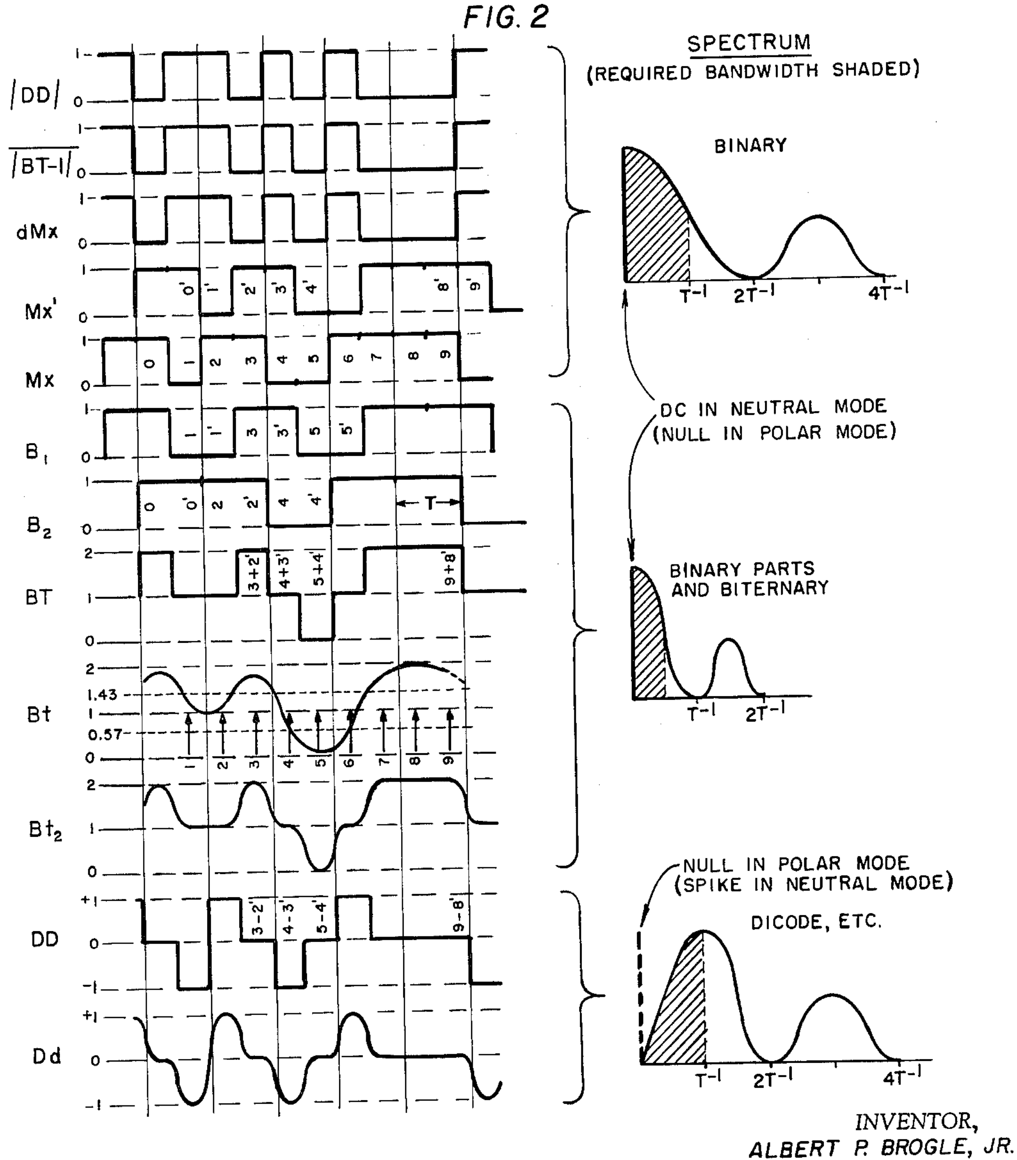
FIG. 2 is a waveform illustration, the central part of which will be helpful in explaining the invention as in FIG. 1 and various other figures, while the upper and lower parts involve its relation to the Ringelhaan improvement and the prior art.

Referring now to FIG. 2, the waveforms have been arranged with various binary translations at the top, the ternary-like translations below, and the translations from binary to biternary near the center; such translations are reversible. Curves $B_1$ and $B_2$ show typical waveforms for a pair of full-bauded binary trains prior to being combined according to the invention. Each pulse has a duration of T seconds and it is noted that pulse train $B_2$ is delayed one-half of a pulse interval or $T/2$ seconds behind binary train $B_1$. Each binary wave can have only a low or high valve; the difference in such values should be alike to properly form a biternary wave. Curve BT shows the ideal biternary waveform which results from combination or addition of binary trains $B_1$ and $B_2$. This combined wave can have three levels a low extreme, if both $B_1$ and $B_2$ are low, a median if either is low and the other high, or high extreme if both are high. For the sake of convenience binary pulse trains $B_1$ and $B_2$ each are shown as containing pulses of +1 units and 00 units representing "mark" or "1" and "space" or "0" (or "space" and "mark") respectively, but any two values could have been chosen so long as each train has the same two values. Biternary wave BT then will contain three levels of amplitude, which in the example given will be +2, +1, and 0. An amplitude of +2 or 0 will occur when each of the binary trains $B_1$ and $B_2$ have the same value and an amplitude of +1 in the biternary signal will occur when $B_1$ and $B_2$ have opposite values, i.e., when one is "mark" or "1" and the other is "space" or "0."

Curve B*t* shows the actual waveform of the biternary wave BT after transmission through a system 115 with modified Gaussian transmission frequency characteristic in which the bandwidth corresponds approximately to the 40 db point on the transmission frequency characteristic. The apparent mutual interference between the pulses of the biternary wave due to the limited bandwidth of the transmission facility is clearly shown in curve B*t*. Except for consideration of bandwidth in most cases either rectangular or actual waveforms are sufficient for both analysis and operation. The spectrum curves indicate by cross-hatching the bandwidth required for transmission of the information; only in waves B*t* and D*d* does this actually represent the bandwidth of the wave shown.

By sampling the received signal at the times 1 through 9 indicated on curve B*t*, the original biternary train can be reconstructed. In FIG. 2 it can be observed that all samples representative of the same information in BT prior to transmission do not have exactly the same value in the received wave B*t*. This characteristic of biternary transmission is fundamental to the understanding of the method and is discussed more fully in the following paragraphs.

Because of the pulse overlap with this method, the value of the received signal at any sampling point is actually affected by four pulses, the two preceding and the two following. The immediately adjacent pulses to the sampling instant form the desired reading while the two outer pulses in a sense perturb this reading. These conditions are illustrated in FIG. 3.

Figure 3:
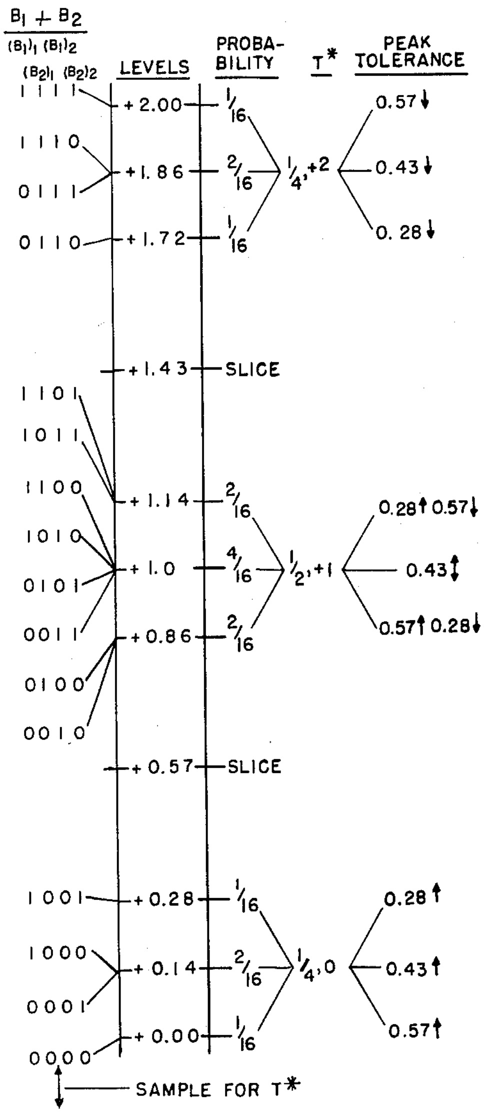
FIG. 3 is a graphical illustration of conditions of the received signal at any sampling point.

The left-hand column of FIG. 3 depicts the 16 possible combinations of binary pulses which influence the value of the received biternary signal. The sampling point is midway in the pulse train as indicated. The second column shows the amplitude levels which occur for the binary combinations of the left-hand column. These fall into three distinct groups corresponding to the three levels of the biternary code. The numerical values are those which result for full-bauded binary pulses having relative amplitudes of +1 and 00 respectively. With relatively minor alteration of the modified Gaussian amplitude characteristic, it is expected that a spread of levels less than indicated in FIG. 2 can be obtained. The slicing levels which are needed in order to produce the proper digital decision in the detecting elements, and which set the maximum tolerance to interference, are also shown in column two. The third column shows the probabilities associated with the levels of column two. These are based directly on the binary code possibilities of the first column and have been calculated for the case where the 1's and 0's are equally likely and distributed in a purely random manner. The fourth column is the desired relative value or outcome of the received signal B*t* and needs no further comment. The fifth and last column is the peak tolerance to interference of the possible sampled amplitudes of column two. The probabilities of column three give the percentage of time that these tolerance will hold. The mean value is clearly 0.43; since the mean difference in the levels is 0.86 the ratio is 0.5, the usual peak tolerance attributed to ternary transmission. The arrows next to the numerical values indicate the direction in which the interference must occur to produce error.

Separation of the two original binary trains from the received biternary signal after sampling is the heart of the detection problem. The detection method to be described in connection with FIGS. 5 and 6 utilizes samples of the biternary signal taken every $T/2$ seconds at the $T/4$ and $3T/4$ intervals of the original binary pulses as indicated in curve B*t* of FIG. 2. Since B*t* in theory contains more information, 3.16 bits per sample, than the 2 bit of information per interval T necessary to recover $B_1$ and $B_2$, sampling of B*t* at the indicated rate of $2/T$ samples per second is not required. However, sampling at a lesser average rate would not relieve the requirement for the minimum sampling interval of $T/2$ seconds and would create an unduly complicated detection problem. In addition, the possibility for error detection and correction would be precluded. For these reasons the preferred detection method uses samples of B*t* taken every $T/2$ seconds.

From FIG. 3 it is seen that an ambiguity exists in the ones of the biternary wave sample B*t* identified generally as samples T* and particularly as samples $T_1$*, $T_2$*, etc. that is, $B_1$ and $B_2$ for any sample giving a one value to T* could be "0" and "1" and "0" respectively. The detection or decoding circuit must therefore be capable of determining the correct choice.

The information necessary to resolve this ambiguity is inherent in the fact that each sample of the biternary signal contains the $B_1$ or $B_2$, as the case may be, from the previous sample. Because of this relationship, the presence of a +1 or 00 value of T* preceding or following one or more zero values of T* makes it possible to always determine the correct choice for $B_1$ and $B_2$. The only possible outcome not covered by this rule is the occurrence of all 0's in $B_1$ and all 1's in $B_2$ or vice-versa. This possibility can be avoided quite simply by preventing all 1's or all 0's of $B_1$ and $B_2$ from ever occurring in the initial pulse coding process. For 6 binary digits, this requires the elimination of only one of the 64 possible quantizing levels, resulting in negligible loss in performance. However, negligible loss in performance will result if this possiblity is ignored completely since on a statistical basis all 1's or 0's in one train and all 0' or 1's in the other cannot persist indefinitely even though the process might start in this manner. As will be seen from an examination of the operation of the circuit of FIG. 5, once the pattern changes, the ambiguity is resolved for all remaining time.

Figure 4:
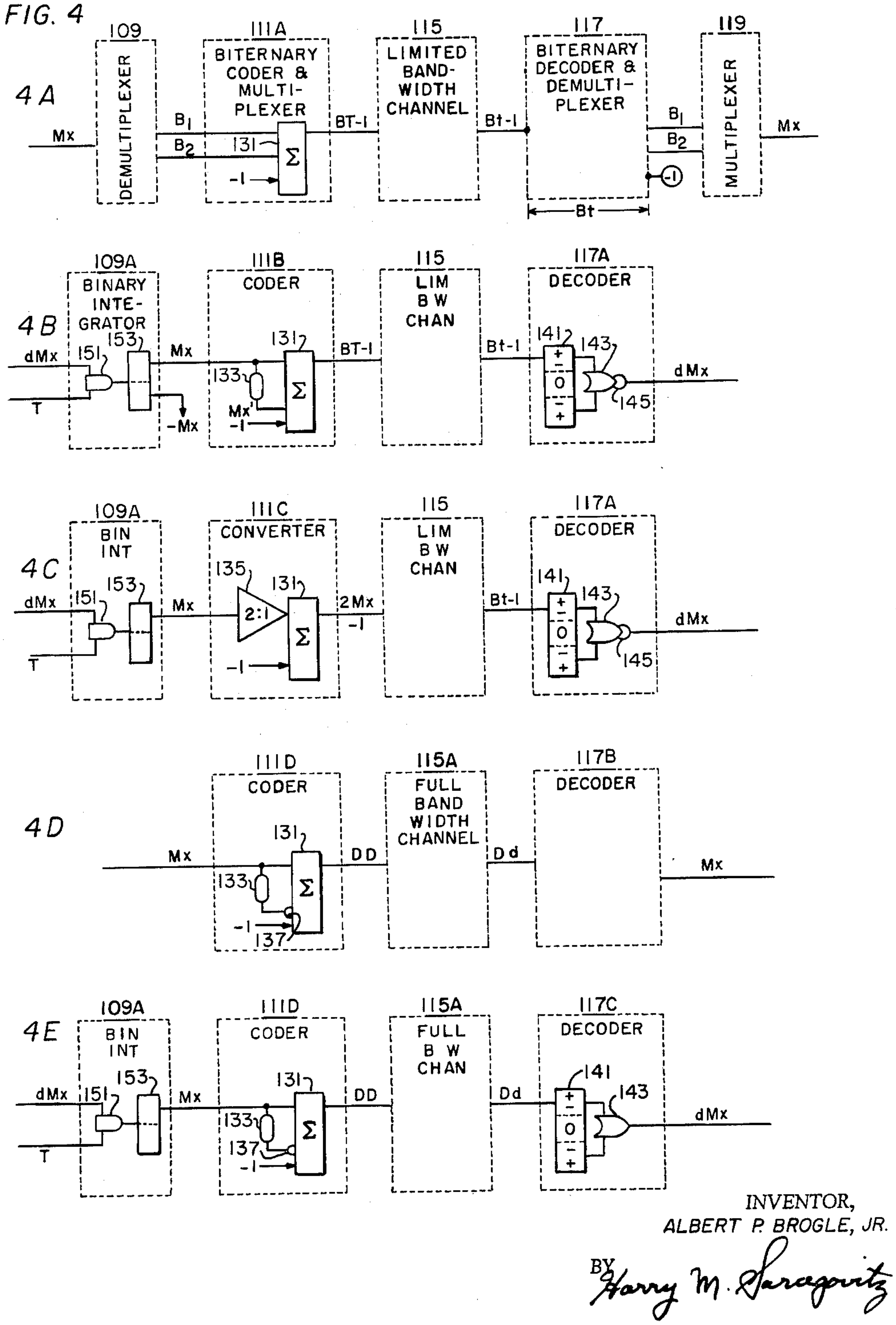

Before considering the details of decoding and error detection a comparison to the simplifications of Ringelhaan and to the prior art will be found helpful. In FIG. 4 many of the components are extremely simple and several are identical or nearly so in the variations of the invention and even in the prior art. For convenience in analysis the waveforms transmitted have been assumed in as few forms as practical, and commonly known translations at transmitted and receiver show the similarities and differences of the various techniques; if the original information waves were assumed identical each technique would lead to a complete set of waves, and the comparison would become vary difficult.

FIG. 4A corresponds to FIG. 1 except:

(a) In case of only a single wave M*x* to be transmitted the demultiplexer 109 and multiplexer 119 provide for temporary conversion to waves $B_1$ and $B_2$ to be used in the manner of FIG. 1. It will be helpful to now consider this wave M*x* as the basic binary wave for most purposes, containing all the information of the others, $B_1$ and $B_2$.

(b) The now more common polar mode of operation as waves BT–1 and B*t*–1 is assumed, involving a bias on the coder 111A illustrated as a further (—1) input to adder 131 and a compensating bias on the decoder 117 illustrated by changing the ground zero reference to a bias (—1) terminal.

FIGS. 4B and C illustrate simplifications in biternary techniques in case of only such single wave assumed as M*x* to be transmitted. Form the several translations involved in FIG. 4A one might predict the probability of simplifications, which should now be considered step-by-step.

(a) In FIG. 4B coder 111B, input M*x* directly and thru a one baud delay 133 as M*x'* to adder 131 would provide the same neutral biternary form BT as in FIG. 4A but more simply, while the further bias input (—1) merely converts to polar form BT–1 and the channel converts this to B*t*–1.

(b) In FIG. 4C the coder as such is found unnecessary since a binary wave is found to be converted to biternary still more simply by the channel itself if of half the bandwidth required for binary operation; the converter 111C is merely to provide suitable amplitude and bias levels to provide the same overall output as in FIG. 4B, therefore requiring a 2:1 amplifier 135 and the bias (—1) inputs to the adder 131, providing merely a polar binary output 2 M*x*–1 to the channel.

(c) In both FIGS. 4B and C, a very simple decoder 117A is suitable if a binary integrator 109A is used at thetransmitter. The decoder amounts to merely a full wave rectifier, shown as an ordinary inverter 141 (not a binary inverter or NOT circuit) with both outputs to an OR gate 143, providing an output /BT–1/ corresponding to the absolute value of BT–1, and a NOT circuit 145 at the OR gate output, providing an overall output shown as $/\overline{\text{BT–1}}/$ identical to *d*M*x*, commonly known as the binary derivative of N.*x*. An original input *d*M*x* binary integator 109A an a clock of timer input T thru AND gate 151 would cause successive changes in bistable circuit 153 to produce integrator output M*x*; if integrator output —M*x* (due to a different integration constant) were used the overall output *d*M*x* would not be changed. If this integrator were in the receiver there would be an undesirable but not fatal ambiguity as between M*x* and —M*x*.

Thus, in the simplest unambiguous form the binary integrator 109A, limited bandwidth channel 115, and full-wave rectifier in decoder 117A are the only significant elements required for a biternary code system. The full wave rectification aids an intuitive explanation of the double frequency available at the output compared to the bandwidth of the channel, and similarly the inherent minimum delay of a limited bandwidth channel aids and intuitive explanation why the delay 133 in FIG. 3B is not essential in FIG. 3C.

In FIG. 4D the dicode or twinned binary of Meacham is illustrated. In this case the delay input thru a NOT circuit 137 and the bias (—1) represents a subtraction by the adder 131 resulting in wave DD. This avoids DC by the polar form and suppresses low frequency signal components since like extremes do not repeat; this would never be used in neutral form since suppression of low frequency signal components would be utterly useless of DC were to be allowed. A suitable decoder 117B appears in Meacham. Waveform DD would become D*d* in the required full bandwidth channel. By contrast waveform BT would become $Bt_2$ in such a channel, but represents a waste of channel information capacity since waveform B*t* would transmit the same information.

In FIG. 4E the bipolar operation is illustrated, statistically identical to dicode but permitting simpler circuits. In this case, the decoder 117C is identical to 117A except in omitting the NOT circuit, providing an overall output /DD/ also identical to *d*M*x*, and the binary integrators 109A are identical. The relation of FIGS. 3E to 3D is somewhat analogous to that of FIGS. 3B to 3A (as shown or with 109 and 111A replaced by 111B).

It is particularly interesting to note that substantially identical components perfor very differently; with the NOT circuit 145 (a mere polarity inverter in FIG. 4B the half bandwidth channel can be used in non-carrier or carrier system but low (or near carrier) frequency component is not suppressed and either polar or neutral operation might be used, whereas with the NOT circuit 137 (to change addition to subtraction) is FIG. 4E a full bandwidth channel is required but low frequency component is suppressed and only polar operation would be used (to also suppress DC) and only in non-carrier systems. In retrospect, the main reason why the systems bear such a close resemblance may be found in the well recognized fact that addition or subtraction modulo—2 of a binary wave direct and delayed one baud both produce a binary derivative; thus the ternary-like transmission is different depending on addition or subtraction, but the full-wave rectification (the modulo–2 aspect) converts both to the binary derivative. In converting binary to Gray Code addition is assumed in the simultaneous mode in Fundamentals of Digital Computers by Mandl, Prentice Hall, 1958, p. 85, but the same conclusions would be reached by subtraction or in serial mode.

It is very difficult to contrast FIGS. 1, 4A, or 4C to FIG. 4D but very easy to contrast FIG. 4B to FIG. 4E, and to compare FIGS. 1, 4A, 4B, and 4C, and FIGS. 4D and 4E. Thus the Ringelhaan improvements are important in actual operation and also in understanding the significant relation of the original biternary techinque to the prior art. In FIG. 2 the sample numbers 1 to 9 and delayed sample numbers 1' to 9' and their various sums and differences on the several waveforms will be helpful to recognize why various apparently very different techniques can lead to the same results and apparently very similar techniques lead to very different results.

Figure 5:
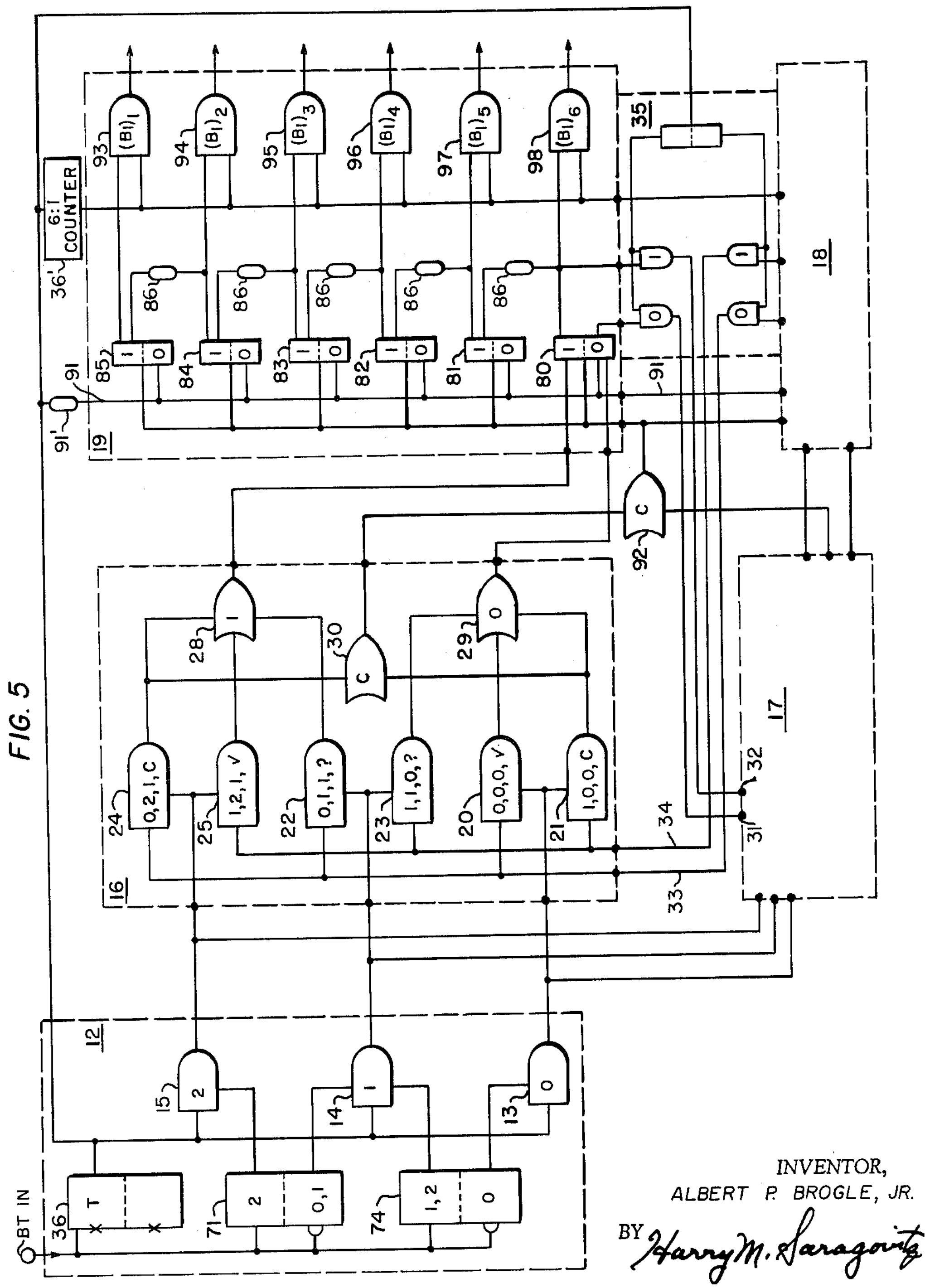
FIG. 5 is a block diagram of the receiver or detection circuit.

In the detection or decoding and demultiplexing circuit shown in FIG. 5, the received biternary signal $Bt$ is sampled periodically in the manner described in the discussion of FIGS. 1, 2 and 4, often known as time quantizing, and also sliced to identify the amplitude levels, commonly known as amplitude quantizing. The order of these operations is immaterial, but the quantizer 12 illustrates a convenient way to perform both functions. It includes a pair of Schmitt trigger circuits each adapted to trigger at a different level of input voltage. The first or upper trigger circuit 71 is biased so that its can be "triggered" to state 2 from 0, 1 only by pulse samples T* of $Bt$ which have a voltage above the 1.43 slicing level. Similarly, the circuit 74 is biased so that it will be "triggered" to state 1, 2 from state 0 only by pulse samples T* having a voltage above 0.57 slicing level. Inputs are applied simultaneously to circuit 71 and 74. The 2 output of the upper trigger circuit 71 is applied directly to AND gate 15 and the opposite or 0, 1 output is applied to gate 14. The 1, 2 output from the lower trigger circuit 74 is also applied to gate 14 and the opposite or 0 output applied to gate 13. The pulses from synchronizde clock 36 are applied to AND gates 13, 14, 15, to pass outputs only at the proper sampling time.

If the input voltage is greater than the 1.43 slicing level both the upper and lower circuits 71 and 74 will be triggered to the upper states 2 and 1, 2. Gate 15 representing 2 for T* is energized since it is connected directly to the upper or 2 output of circuit 71, but neither gate 13 nor gate 14 is energized since each is connected to a lower output 0, 1 of circuit 71 or 0 output from circuit 74. When the input voltage is less than 0.57 neither of the trigger circuits will be activated to the upper states 2 and 1, 2. Gate 13 will then be energized representing a value of 0 for T*; but neither gate 14 nor gate 15 will be energized. The output from each of gates 13, 14, and 15 is applied in parallel to decombining circuits 16 and 17 which decode the biternary samples to reconstruct the original binary waves $B_1$ and $B_2$. Decombining circuits 16 and 17 are each identical in construction and operation; and in order to avoid cluttering the drawing with unnecessary details, only circuit 16 has been shown in detail and the discussion, although limited thereto, will also be applicable to the decombining circuit 17.

The output of gate 13, representative of $T^*=00$, is applied in parallel to AND gates 20 and 21. In a similar manner, gates 22 and 23 are connected to the output of gate 14, and gates 24 and 25 are connected to the output of gate 15. The second or gating signal for AND gates 20, 22, and 24 is supplied by line 33 from shift register 18 through timer switch 35 and is representative of a "0" or "space" previously stored in shift register 18. The second or gating signal for AND gates 21, 23, and 25 is supplied by line 34 through switch 35 from shift register 18 and is representative of a "1" or "mark" previously stored in shift register 18. The outputs of gates 20 and 23 represent "0" pulses in binary wave $B_2$ and are supplied through OR gate 29 to shift register 19 for storage. Similarly the outputs of gates 22 and 25 represent "1" pulses in binary wave $B_2$ and are supplied through OR gate 28 to shift register 19 for storage. The output of gate 21 represents a "0" pulse in binary wave $B_2$ and is supplied to shift register 19 through gate 29 as are the outputs of gates 20 and 23. However, the output of gate 21 is also utilized to provide "correction" pulses for information stored in shift registers 18 and 19 and is connected to shift registers 18 and 19 through OR gate 30. Similarly, the output of gate 24 represents a "1" pulse in binary wave $B_2$ and is simultaneously utilized as a source of correction pulses for information stored in shift registers 18 and 19. Decombining circuit 17 provides information representative of the pulses in binary $B_1$ to shift register 18 and supplies correction pulses to shift registers 18 and 19 by means of a circuit which is identical to that described above for decombining circuit 16. The second or gating signals for gates 20 to 25 of decombining circuit 17 are supplied from shift register 19 through switch 35 and lines 31 and 32. The multiple characters in AND gates 20–25 designate assumed prior reading, present level, present reading, and an indication to change (C), confirm (check mark), or leave in doubt (question mark). A suitable source of synchronized timing pulses 36 (shown as merely an unsymmetrical astable circuit to generate sharp timing pulses with a synchronizing input from the wave $Bt$) is also provided for gates 13, 14, 15, switch 35, and shift registers 18 and 19.

Figure 6:
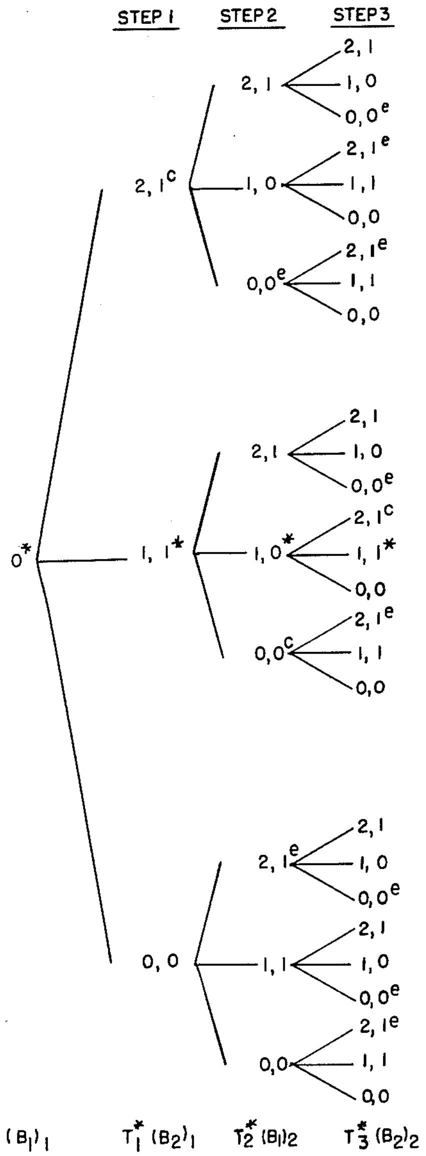
FIG. 6 is a graphical illustration useful in explaining the operation of the circuit shown in FIG. 5.

In order to synthesize the overall detection process which takes place in the operation of the circuit of FIG. 5 and to examine the possibilities for error detection and correction use of the chart of FIG. 6 is helpful. Every possible combination of $B_1$, $B_2$, and T* for three successive sampling intervals starting from the initial sample is shown in FIG. 6.

Each step of the detection process including the first obeys the basic logical relation that the value of $B_1$ or $B_2$ determined in the previous sample of $Bt$ together with the current value of T* uniquely determines the current values of $B_2$ or $B_1$. Since for the first step no previous value of $B_1$ can be available, the process must initially assume a value for $(B_1)_1$ and in FIG. 6 the process starts with the assumption that $(B_1)_1$="0" or "space." This is shown in the left-hand column of the figure. If the value of $T_1^*$ in the first sample is 00, positive confirmation of $(B_1)_1$="0" is established and $(B_2)_1$ must also be "0" since $T^*=00$ can only occur when both $B_1$ and $B_2$ are "0." This relationship is clearly shown in FIG. 3. If $T_1^*$ is +1, $(B_1)_1$ is still presumed to be "0" and $(B_2)_1$ is presumed to be "1." If $T_1^*$ is +2 both $(B_1)_1$ and $(B_2)_1$ must be "1" and the previous assumption that $(B_1)_1$ was "0" must therefore be in error. A correction of $(B_1)_1$ is then necessary and this is indicated by the superscript $c$ on the value $(B_2)_1$. The process is repeated for the second sample exactly as for the first sample except that $(B_2)_1$ and $T_2^*$ are now used to obtain the next value of $B_1$ analogous to $(B_1)_1$ and $T_1^*$ yielding $(B_2)_1$ previously. The necessity for the two decombining circuits 16 and 17 of the type shown in FIG. 3, or for time sharing of a single circuit, is therefore indicated. It is also observed that the ambiguity of the first step can continue through succeeding steps provided each sample of T* is +1. However, as stated previously, effective measures can be taken, if desired, to insure correction of this ambiguity within a prescribed number of steps.

Two new possibilities are seen to arise in sampling step 2. These are indicated by the superscript $e$ and represent the occurrence of a result in $T_2^*$ which could not possibly have been generated from $B_1$ and $B_2$. Therefore, an error in transmission is the only possible cause for these results. The discussion of FIG. 7 will treat this subject in more detail. It may also be helpful to note that each reading involves three possibilities, one either indeterminate (in case of a sequence of ones) or in error (as noted above), the other two definite (one of these sometimes establishing a change to correct previous indeterminate readings).

The third sample of $Bt$ yields results in $T_3^*$ and $(B_2)_2$ completely in conformance with the results of the first two steps. By this time, $3^3$ or 27 combinations of the firt three samples are possible, and of these 8 are impossible outcomes or errors, one (1*) is still an ambiguous outcome, and one ($1^c$) is the outcome which can correct the ambiguity. Further successive samples will exhibit the same characteristics but new possible combinations for error will occur. It should be noted that once a correction value for $B_1$ or $B_2$ is determined, as indicated by the superscript $c$, all previous values of $B_1$ and $B_2$ must be changed since they are in error. Once an ambiguity is resolved, it is resolved for all remaining time during a given transmission sequence.

The operation of the detection circuit of FIG. 5 will now be described. Assume that the received wave is that shown for B*t* in FIG. 1 and that the samples are taken as indicated. In accordance with the basic logic for detection as discussed in the description of FIG. 6, an initial value must be assumed for $B_1$. This can be done by initially establishing a gating voltage or pulse on either line 33 or 34; it makes no difference which line is chosen. For the purpose of this discussion, assume that switch 35 closes lines 33 and 34 and that shift register 18, prior to receipt of a message, is always set so that a gating voltage is present on line 33. This will correspond to the assumption that $(B_1)_1$="0." Sample 1 is then taken at the point indicated in FIG. 1 and passed by gate 13, 14, or 15. Since its value lies above the +1.43 slicing level it will be passed only to gate 15 thereby giving a value of +2 for $T_1^*$. An output pulse from gate 15 is then sent to both decombining circuits 16 and 17. There will be no output from decombining circuit 17 since there is no gating voltage present on either line 31 or line 32 due to the open circuit in these lines caused by switch 35. However, in decombining circuit 16, gate 24 will be enabled due to the presence of a voltage on line 33 in addition to the pulse from gate 15. The output from gate 24 is simultaneously applied to OR gates 28 and 30. Gate 28 sends a signal to shift register 19 where it is stored as a "1" for $(B_2)_1$. At the same time a correction pulse from gate 30 is sent to shift registers 18 and 19 to change all previously stored pulses in each register. In register 18 this results in the value for $(B_1)_1$ being changed from the assumed "0" which was incorrect to "1" which is correct. Any changes made in register 19 will be of no consequence since no previously stored pulses are present in this register at this time. The system is now ready for receipt of the second sample. A suitable timing signal from clock 36 then causes switch 35 to close lines 31 and 32 and open lines 33 and 34 allowing the last stored value of $B_2$ to be read and applied in the form of a gating signal to decombining circuit 17. This will result in a voltage appearing on line 32 since the value of $(B_2)_1$ was "1." At the same time, sample 2 of B*t* is applied to gate 12. As can be seen from FIG. 1, this sample has a value which lies between the +0.57 and *1.43 slicing levels, so a signal will be passed to gate 14 only. Since no voltages appear on lines 31, 33, and 34, only gate 23 of decombiner 17 will be enabled by the output of gate 14. The output of gate 23 passes through OR gate 29 of decombiner 17 and is stored in shift register 18 as a "0" for $(B_1)_2$. The next timing signal to switch 35 then causes this last-stored value $(B_1)_2$ to be read and applied in the form of a gating signal on line 33. No signal will appear on lines 31, 32, and 34. Sample 3 of B*t* is applied to gate 12 and, as seen from FIG. 1, this sample again has a value which lies between the +0.57 and +1.43 slicing levels, so a signal corresponding to $T^*=+1$ will again appear at the output of gate 14. Only gate 22 of decombiner 16 will be enabled by this sample since no voltages appear on lines 31, 32, and 34. The output of gate 22 passes through OR gate 28 and is sent to shift register to be stored as a "1" for the value of $(B_2)_2$. The process repeats again for the fourth sample with line 32 and gate 15 being energized, and so on.

In the circuit of FIG. 5 pulse samples of B*t* which lie below the +0.57 slicing level will be passed by gate 13 only and represent $T^*=00$; pulse samples of B*t* which lie between the +0.57 slicing level and the +1.43 slicing level will result in a signal from gate 14 only and represent $T^*=+1$; and, finally, pulse samples of B*t* which are above the +1.43 slicing level will result in an output from gate 15 only and represent $T^*=+2$. It is also noted that the outputs of gates 28 in decombining circuits 16 and 17 designate a "1" for $B_1$ or $B_2$ in the received signal B*t* while the outputs of gates 29 designate a "0" for $B_1$ or $B_2$. A signal from gate 30 in either circuit 16 or 17 is applied to both shift registers 18 and 19 to change the value of all previously stored pulses. Lines 31 and 33, when energized, signify that the previous value of $B_2$ or $B_1$, respectively, was a "0." Similarly, lines 32 and 34, when energized, signify that the previous value of $B_2$ or $B_1$, respectively was a "1."

Shift registers 18 and 19 are made up of six typical bistable elements including three types of inputs, 0, 1 and change. One state of each flip-flop 80 thru 85 is designated binary 1 and the other state binary 0. Output pulses from gate 29 of decombining circuit 15 or 17, designating 0, are applied to the 0 input of stage 80 to cause it to change to a zero state. In a similar manner output pulses from gate 28 of decombining circuits 16 or 17, designating 1, are applied to the 1 input of stage 80. These input pulses are connected only to flip-flop 80 as shown and are applied to the 1 input of stage 80. These input pulses are connected only to flip-flop 80 as shown and are applied unsymmetrically to produce the desired state in flip-flop 80. The shift pulses on line 91 are a continuous train of pulses applied by clock 36, are timed by delay 91' to occur about midway between the pulses received from circuits 16 or 17, and are also applied unsymmetrically to the 1 inputs (of all stages) to drive all flip-flops 80 through 85 to state "0." The coupling between successive flip-flops is such that a succeeding flip-flop will change to state 1 only if the preceding flip-flop had been in state "1." Delay sections 86 which provide this coupling have a delay much smaller than the interval between input pulses and are required in order to prevent a particular flip-flop from receiving a triggering pulse simultaneously from the shift line and from a preceding flip-flop. Both zero and 1 outputs from flip-flop 80 are used to control the zero and 1 feedback inputs on lines 31 and 32 or 33 and 34 to decombining circuits 16 and 17. In flip-flop circuits 81 through 85 only the 1 output is used for registering and shifting between stages. Change pulse C from gates 30 of decombining circuits 16 and 17, whenever it may occur, is applied through OR gate 92 symmetrically to all the flip-flop circuits 80 through 85 and therefore changes the state of all registers, which is the desired condition for this event. In cases where change pulse C occurs before all 6 stages are filled, for example, when only flip-flop stages 80, 81, and 82 are filled, the fact that stages 83, 84, and 85 also change state from "0" to "1" is immaterial since these numbers will be shifted out of the register and will, in effect, disappear before a reading is taken. AND gates 93 through 98 are employed to take a parallel reading of all 6 stages upon receipt of a read pulse on line 99 from clock 36 through counter 36', which occurs only once for every 6 input pulses and only when all flip-flop stages have been filled. The outputs of gates 93 to 98 represent original binary pulses $(B_1)_1$ through $(B_1)_6$ (or $(B_2)_1$ through $(B_2)_6$), respectively, and can then be fed directly to the input of a digital-analogue decoder or other suitable output which will utilize the 6 binary digits thus detected and registered. The register then accepts another 6 digits, is "read" to produce another output in gates 93 through 98, and so forth. More or fewer stages could be used if desired without departing from the scope of the invention.

If desired, provisions could be made for automatically disconnecting the output of gates 30 in decombining circuits 16 and 17 for the duration of a particular input sequence once a change pulse *c* has been sent to shift registers 18 and 19. This would prevent subsequent possible "error" pulses of the type described in conjunction with FIG. 4 from activating gate 30 to send incorrect change pulses *c* to the shift registers.

Since a biternary signal in theory contains more information, 3.16 bits per sample, than the two bits of information necessary to recover the binary trains, error detection and correction is possible. Examination of FIG. 6 shows that impossible outcomes or errors occur for the following combinations of successive values of T*:

0, +2
+2, 0
+2, +1, +2
0, +1, 0

By induction, a general rule for error detecting combinations of T* can be derived. The result shows that errors are indicated whenever both 2's or both zeros are separated by an odd number of 1's or whenever a 2 and a 0 are separated by an even number of 1's including no 1's as in the combinations 2, 0 and 0, 2. Thus, the particular pairs of zeros, twos, or zero and two (in either order) separated by a certain number of successive ones identifies errors. For reasons of generality it is often convenient to use the following terms:

(a) "extremes" for levels 0 and 2
(b) "medians" for level 1 (avoiding the common claim term "means")
(c) "even number" (of such medians) including the special case zero, actually very common in the present system.

Thus in general errors are indicated whenever like extremes are separated by an odd number of medians or whenever unlike extremes are separated by an even number of medians. Besides providing for error detection these same characteristics of biternary code provide for reduced bandwidth but no DC suppression, whereas prior binary derived three level codes have provided for DC suppression without change in bandwidth. Provision of circuits which can detect these combinations will thus detect errors in transmission.

Figure 7:
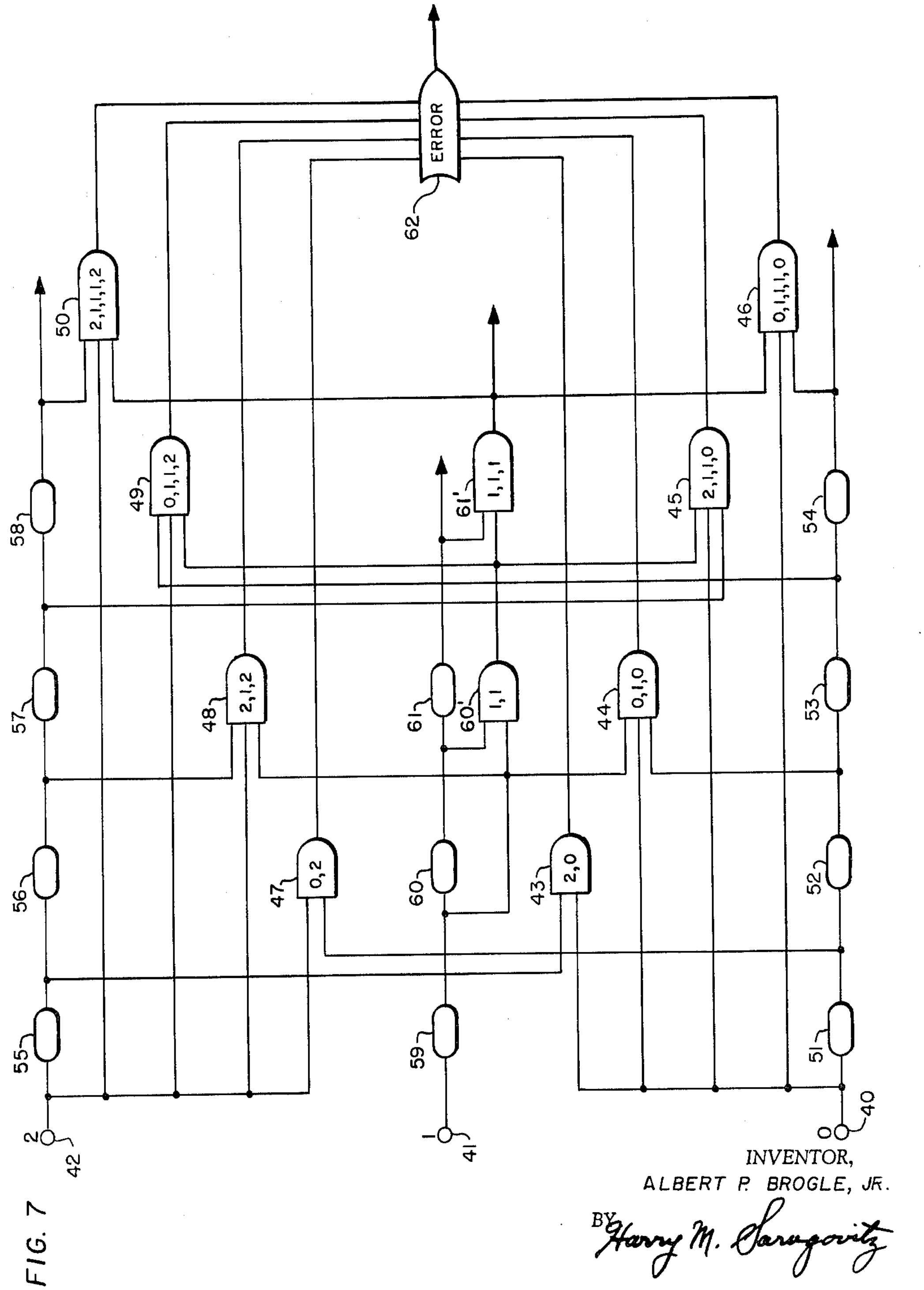
FIG. 7 is an error detection circuit which can be used in conjunction with the circuit of FIG. 5.

FIG. 7 shows a preferred form of a circuit for detecting errors in such pairs separated by up to three successive ones. Because of the improbability of the random errors found in transmission causing the higher order error combinations in T* to occur, the desirability of implementing more than one or two stages of the circuit of FIG. 7 is questionable.

The error detection circuit of FIG. 7 has three input terminals 40, 41, and 42 which are adapted to be connected to the outputs of gates 13, 14, and 15 which represent values of $T^*=00$, $T^*=+1$, and $T^*=+2$, respectively. Directly connected to terminal 40 are the first input terminals of AND gates 43, 44, 45, and 46. Terminal 42 is directly connected to the first input terminal of AND gates 47, 48, 49, and 50. Delay lines 51, 52, 53, and 54 are connected in series, with delay line 51 being connected to terminal 40. Terminal 42 is connected to delay line 55 which is, in turn, connected in series with delay lines 56, 57, and 58. Similarly, terminal 41 is connected to delay line 59 which is, in turn, connected in series with delay lines 60 and 61. Each of delay lines 51 to 61 will delay an incoming signal $T/2$ seconds which is equal to the time between successive samples of B$t$ where T is equal to the length in seconds of the pulse interval of waves $B_1$ and $B_2$. The outputs of delay lines 51 through 58 are each applied to a different one of gates 43 through 50, i.e., the output of delay line 51 is applied to gate 47, that of line 52 is applied to gate 44, that of line 53 to gate 49, that of line 54 to gate 46, that of line 55 to gate 43, that of line 56 to gate 48, that of line 57 to gate 45, and the output of delay line 58 is applied to gate 50. The output of delay line 59 is applied to gates 44 and 48 directly, combined with the output of line 60 in AND gate 60' and applied to gates 45 and 49, and both further combined with the output of line 61 in AND gate 61' and applied to gates 46 and 50.

The operation of the error detection circuit of FIG. 7 will now be discussed. As an example, consider the case where four consecutive values of T* are 00, +1, +1, +2. As can be seen from a consideration of the pattern established in FIG. 4, the value of $T^*=+2$ following values of 0, 1, 1 could not occur in the absence of transmission errors. The samples of T* are spaced $T/2$ seconds apart, so that the fourth value of T* in the above example will occur $3T/2$ seconds after the first, the second value of T* will occur $2T/2$ seconds after the first, and the second will occur $T/2$ seconds after the first. Therefore, the first sample, $T^*=00$ will pass through delay lines 51, 52, and 53, each having a time delay of $T/2$ seconds, and will be applied to gate 49 at the same time as the second sample, after passing through delay lines 59 and 60, the third sample after being delayed by delay line 59, and the fourth sample which is not delayed are applied to gate 49. Thus gate 49 is energized and its output is fed through OR gate 62 to signify an error. Each of gates 43 to 50 will be energized by a different combination of successive values of T*, and these combinations have been indicated in FIG. 5 at the output of each gate. The output of each gate 43 to 50 is applied to gate 62, the output of which can be used to correct or indicate errors.

In theory, the output of gate 62 can be fed back into the circuit of FIG. 5 in order to correct the detected errors. Examination of FIG. 4, however, raises the question as to which sample of T* is in error and whether $B_1$ or $B_2$ should be changed in order to effect proper correction, or if any changes should be made since the decisions made in the decombining circuit could possibly be correct even if an error is indicated. Without the availability of statistical information to specify which types of errors are more likely to occur, corrections can thus be made only on a purely random basis. Provided the errors are not heavily weighted in favor of one type, correction by arbitrary selection can still be up to 50 percent successful. The circuit of FIG. 7 does detect errors and possible errors and could be used to indicate such errors without making any changes in the decisions made in the decoding circuit of FIG. 5.

Tests comparing the biternary transmission method of this invention with quaternary transmission show that biternary transmission is more tolerant to the effects of interference than quaternary transmission and significantly reduces a major problem of quaternary transmission of excessive errors due to low frequency cut-off effects which result in the presence of a transient decay between successive pulses. The maximum tolerable low frequency cut-off point, $f_0$, in cycles per second for biternary transmission is approximately 4½ times higher than the low frequency cut-off point, $f_0$, for quaternary transmission when an audio order-wire facility must be provided. On low-capacity systems (less than 48 channels) clamping or some other corrective method must be provided for biternary transmission, and clamping must be provided for all quaternary systems. However, the error rate due to low frequency cut-off effects is so high for quaternary transmission that any method of correction is unlikely to produce satisfactory performance.

The superiority of the biternary method over the quaternary method with respect to low frequency cut-off effects has been found to be due to a combination of conditions. These include the greater tolerance of biternary transmission to peak interference, the greater likelihood of biternary signals returning to zero amplitude after each pulse and thus cancelling the decay of successive like pulses, and finally the greater concentration of energy at higher frequencies in biternary transmission because of the double rate pulse train which is a basic property of the method.

The phase and amplitude uncertainties of biternary and quaternary systems are about the same while the sensitivity to timing uncertainties of biternary systems is almost an order of magnitude greater than that of quaternary systems; however, the increased requirements for timing accuracy imposed by biternary transmission are capable of solution with known techniques. Biternary transmission is therefore the only means available for satisfying many present pulse code communication requirements in applications where binary transmission cannot be employed.

It has been noted in IRE Transactions of the Professional Group on Communications Systems, vol. CS–8, No. 3, September 1960, title "A New Transmission Method for Pulse-Code Modulation Communication Systems" that the shift register is required only if readings are to be stored for correction when an error is discovered. Actually the output of decombining circuit 16 is the desired information train and need not be stored before read-out. A brief storage, as in bistable circuit 80, is required merely to control inputs such as 31 and 32 to circuit 17. By time sharing a single circuit 16 could serve the desired purpose; in the case of a single input wave this time sharing could be considered as a form of multiplexing avoiding the need for multiplexer 119 in FIG. 4A.

The use of the terms "a pair of binary wave trains" and "a pair of binary pulse trains" in the claims does not imply that such trains must be of entirely independent origin. The claims are intended to cover various equivalents including the situation where a biternary signal is formed from a single binary wave train by dividing the binary train into two groups, delaying one of the groups one-half of a pulse interval, and then recombining the two groups to form a composite wave.

While the above principles of the invention have been described in connection with specific apparatus, various modifications may be made as already indicated in comparison of various species and the prior art without departing from the spirit and scope of the invention as set forth in the appended claims.

What is claimed is:

1. An apparatus for reproducing a pair of binary pulse trains which have been combined to form a biternary signal having three amplitude levels comprising: means for sampling said biternary signal every $T/2$ seconds, where T is the length of the pulse interval of said binary pulse trains, to obtain periodic pulse samples of the amplitude of said biternary signal; slicing means for passing each of said pulse samples into one of three lines, each representing one of said three amplitude levels; first and second decombining means each having three inputs and a pair of outputs; said lines being connected to said inputs of said first and second decombining means; first and second storage means connected to said outputs of said first and second decombining means, respectively, for storing output pulses of said first and second decombining means; and feedback means from said first storage means to said second decombining means and from said second storage means to said first decombining means whereby a signal representing the value of the last previously stored pulse is supplied by said feedback means to said decombining means.

2. An apparatus for decoding a biternary signal having three amplitude levels formed from a pair of binary pulse trains having equal pulse intervals comprising means for sampling said biternary signal every $T/2$ seconds where T is the length of the pulse interval of said binary pulse trains; signal dividing means connected to said sampling means and having first, second, and third outputs, each representing one of said three amplitude levels of said biternary signal; first and second decombining means each including first, second and third pairs of gate means, said first output being connected to said first pair of gate means in each of said decombining means, said second output being connected to said second pair of gate means in each of said decombining means, and said third output being connected to said third pair of gate means in each said decombining means; first and second storage means, said first pair of gate means and one gate means of each of said second pair of gate means of said first and second decombining means being connected to said first and second storage means, respectively, to thereby cause said storage means to store signals representing one value of said binary trains; said third pair of gate means and the other gate means of each of said second pair of gate means of said first and second decombining means being connected to said first and second storage means, respectively, to thereby cause said storage means to store signals representing the other value of said binary trains; and feedback means connected from said second storage means to said gate means of said first decombining means and from said first storage means to said gate means of said second decombining means whereby the value of the last previously stored signal is utilized as a gating signal for said gate means, signals representing said one value of said binary pulse trains bein supplied to a first gate means of each of said pairs of gate means and signals representing said other value of said binary pulse trains being supplied to a second gate means of each of said pairs of gate means.

3. An apparatus according to claim 2 wherein the output of one gate means of each of said first and third pairs of gate means in each of said decombining means is also supplied to each of said storage means to cause the values of all previously stored signals to be reversed.

4. An apparatus according to claim 2 wherein said first storage means receives·signals representing one of said binary trains and said second storage receives signals representing the other said binary trains.

5. A pulse communication system comprising a transmitter, channel, and receiver, including means for converting message information into a train of information to be sampled, each sample occupying a single time position and of a quantized level corresponding to one of only three values, having a probability of 50% at a median value and 25% at each of a first extreme or the other extreme, said means preventing samples of opposite extrem value adjacent or separated only by samples of median value unless of odd number, or samples of like extreme value separated only by samples of median value unless of even number, such train being identified as biternary, said channel having an operating bandwidth of only half the bandwidth which would be required for a binary train of samples of the same information content, and means at said receiver station for sampling said biternary three level train of pulses and reconverting into message information.

6. A system as in claim 5 including means to form said biternary train by adding two full baud binary trains whose transition times differ by one-half baud, whereby a line of bandwidth suitable for either binary train can be used to transmit both binary trains.

7. A system as in claim 5 wherein said means for sampling and reconverting includes means for separating pulses of said three levels.

8. In a pulse communication system comprising a transmitter, channel, and receiver, the method of converting message information into a train of information to be sampled, each sample occupying a single time position and of a quantized level corresponding to one of only three values, having a probability of 50% at a median value and 25% at each of a first extreme or the other extreme, preventing samples of opposite extreme value adjacent or separated only by samples of median value unless of odd number, or samples of like extreme value separated only by samples of median value unless of even number, such train being identified as biternary, said channel having an operating bandwidth of only half the bandwidth which would be required for a binary train of samples of the same information content, and at said receiver station sampling said biternary three level train of pulses and reconverting into message information.

9. A pulse communication system comprising:

a transmitter terminal for signals in binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said transmitter terminal and channel including means for transmitting said binary signals over said half bandwidth channel by converting to biternary three-level form signals having a probability of 50% at a median value and 25% at each of two extreme values, in which samples of opposite extreme values are separated only by samples of median value of odd number, and samples of like extreme value are not separated by samples of median value unless of even number.

References Cited by the Examiner

UNITED STATES PATENTS 3,162,724 12/1964 Ringelhaan ---------- 178—68

DAVID G. REDINBAUGH, *Primary Examiner.*

S. J. GLASSMAN, *Assistant Examiner.*